United States Patent [19]

Meier et al.

[11] Patent Number: 5,098,229
[45] Date of Patent: Mar. 24, 1992

[54] SOURCE MATERIAL DELIVERY SYSTEM

[75] Inventors: Frederick U. Meier, Merrimack, N.H.; Mark F. Larrousse, Nashua, N.H.; DAvid S. Harvey, Groton, Mass.

[73] Assignee: Mobil Solar Energy Corporation, Billerica, Mass.

[21] Appl. No.: 693,681

[22] Filed: Apr. 30, 1991

Related U.S. Application Data

[63] Continuation of Ser. No. 423,771, Oct. 18, 1989, abandoned.

[51] Int. Cl.⁵ .................. B65G 53/10; B65G 53/66
[52] U.S. Cl. .......................... 406/93; 406/85; 406/194
[58] Field of Search .............. 406/85, 93, 109, 144, 406/146, 192, 50, 124, 194

[56] References Cited

U.S. PATENT DOCUMENTS

| | | | |
|---|---|---|---|
| 669,409 | 3/1901 | Dunn | 406/93 |
| 1,050,142 | 2/1913 | Cron | 406/85 |
| 1,160,283 | 11/1915 | Hay | 406/93 X |
| 1,164,286 | 12/1915 | Josephs, Jr. | 406/85 |
| 1,164,899 | 12/1915 | White | 406/93 X |
| 1,442,061 | 1/1923 | Frantz | 406/93 X |
| 1,598,558 | 8/1926 | Cohen | 406/93 X |
| 2,683,063 | 7/1954 | Malachick | 406/93 |
| 3,206,255 | 9/1965 | Gray | 406/93 |
| 4,775,267 | 10/1988 | Yamamoto | 406/85 X |

FOREIGN PATENT DOCUMENTS

| | | | |
|---|---|---|---|
| 127524 | 5/1989 | Japan | 406/85 |
| 9105723 | 5/1991 | World Int. Prop. O. | 406/93 |

*Primary Examiner*—Margaret A. Focarino
*Assistant Examiner*—James M. Kannofsky
*Attorney, Agent, or Firm*—Pandiscio & Pandiscio

[57] ABSTRACT

A system for repeatedly supplying a predetermined quantity of solid particulate material, e.g. solid, spherical silicon particles, to a location remote from the area where the particulate material is stored. The system includes a container for storing solid particulate material, a receiving chamber coupled with the container and sized and configured to admit only a predetermined quantity of particulate material from the container, and means for applying at least one stream of a pressurized fluid so as to entrain and transport said predetermined quantity of particulate material from the receiving chamber to the remote location.

27 Claims, 3 Drawing Sheets

SOURCE MATERIAL DELIVERY SYSTEM

This application is a continuation of application Ser. No. 07/423,771 filed Oct. 18, 1989, now abandoned.

FIELD OF THE INVENTION

The present invention relates to material feed systems, and more particularly to apparatus for repeatedly delivering a predetermined quantity of particulate material to a remote site.

BACKGROUND OF THE INVENTION

In a variety of industrial processes it is necessary to repeatedly deliver a predetermined quantity of solid particulate material to a location remote from the location where the particulate material is stored. For instance, with apparatus for growing hollow, tubular crystalline bodies of the type disclosed in U.S. Pat. No. 4,544,528, it is important that the infeed material (particles of solid silicon) be delivered from a storage site to the crucible of the apparatus at substantially the same rate molten silicon is consumed in growing a crystalline body. The delivery is accomplished, for instance, by dispensing the particles from the storage container using a vibratory feeder and then transporting the dispensed particles into the crucible of the apparatus using a chip thruster of the type disclosed in Sink et al U.S. Pat. No. 4,661,324 (the '324 patent).

Unfortunately, with known mechanisms for dispensing solid particulate material from the storage container, e.g. vibratory feeders, it tends to be difficult to precisely control the quantity of material dispensed per unit time. As a result, more or less particulate material may be delivered to the downstream location, e.g. the chip thruster of the '324 patent, than is desired.

OBJECTS AND SUMMARY OF THE INVENTION

One object of the present invention is to provide a system for repeatedly transporting a predetermined quantity of particulate material to a remote location.

A second object of the present invention is to provide a system for use in continuously replenishing the silicon melt in an apparatus for growing hollow, tubular crystalline bodies so as to maintain the level of the melt within predetermined limits.

These and other objects are achieved by a system for repeatedly transporting a predetermined quantity of particulate material, e.g. solid, spherical silicon particles, to a location which is remote from the area where the particulate material is stored. The present system is particularly adapted for use as one component in a larger system for continuously replenishing the silicon melt in the crucible in a crystal furnace, e.g., of the type disclosed in Stormont et al U.S. Pat. No. 4,544,528. The system of the present invention includes a container for storing solid particulate material that is characterized by a substantially uniform particle shape, a receiving chamber coupled with the container for receiving particles from the container, a first high pressure gas jet for providing a pulse of pressurized gas which entrains particles in the receiving chamber and transports the entrained particles into a conduit, and a second high pressure gas jet which provides a stream of pressurized gas in the conduit except when a pulse of pressurized gas is being emitted by the first high pressure gas jet.

The receiving chamber is positioned directly below the storage container and is coupled with the container so that particles in the container will fall under the pull of gravity into the receiving chamber. The latter is sized and configured so that the particles falling into the receiving chamber will coact with one another and with the sidewalls of the receiving chamber to form a pile of particles having a known angle of repose and hence a predetermined volume of particles. This pile blocks the aperture connecting the container and the receiving chamber, thereby preventing additional particles from falling into the receiving chamber.

The predetermined quantity of particles in the receiving chamber is carried by a pulse of gas provided by the first jet out of the receiving chamber and into the conduit. A stream of pressurized gas from the second jet carries the silicon particles through the conduit and ejects them from the far end of the conduit for disposition by other apparatus. Thus, for example, the conduit may be coupled to apparatus for further handling or otherwise treating the particles. In the preferred embodiment of the invention, the particles are spherical silicon particles and the conduit is connected so as to feed the particles to crystal growing apparatus.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION OF THE INVENTION

The present invention requires the use of free-flowing particulate material having a substantially uniform particle shape and a relatively narrow particle size range such that different piles of the same particles formed by free fall will have the same angle of repose, whereby the angle of repose is predictable for subsequently formed piles. Preferably the particles are spherical and, in the preferred embodiment of this invention, the particulate source material comprises high purity, spherical, free-flowing beads of silicon particles, e.g. "ETHYL POLYSILICON" sold by Ethyl Corporation, Baton Rouge, La. The ETHYL POLYSILICON particles or beads, which are believed to be manufactured by a fluidized bed process, are spherical and have a particle size distribution of 150–1500 microns, with an average size of 700 microns. However, larger or smaller particle sizes may be accommodated depending upon such factors as source material composition, the geometry of the delivery system, and the apparatus to which the particles are fed.

Figure 1:
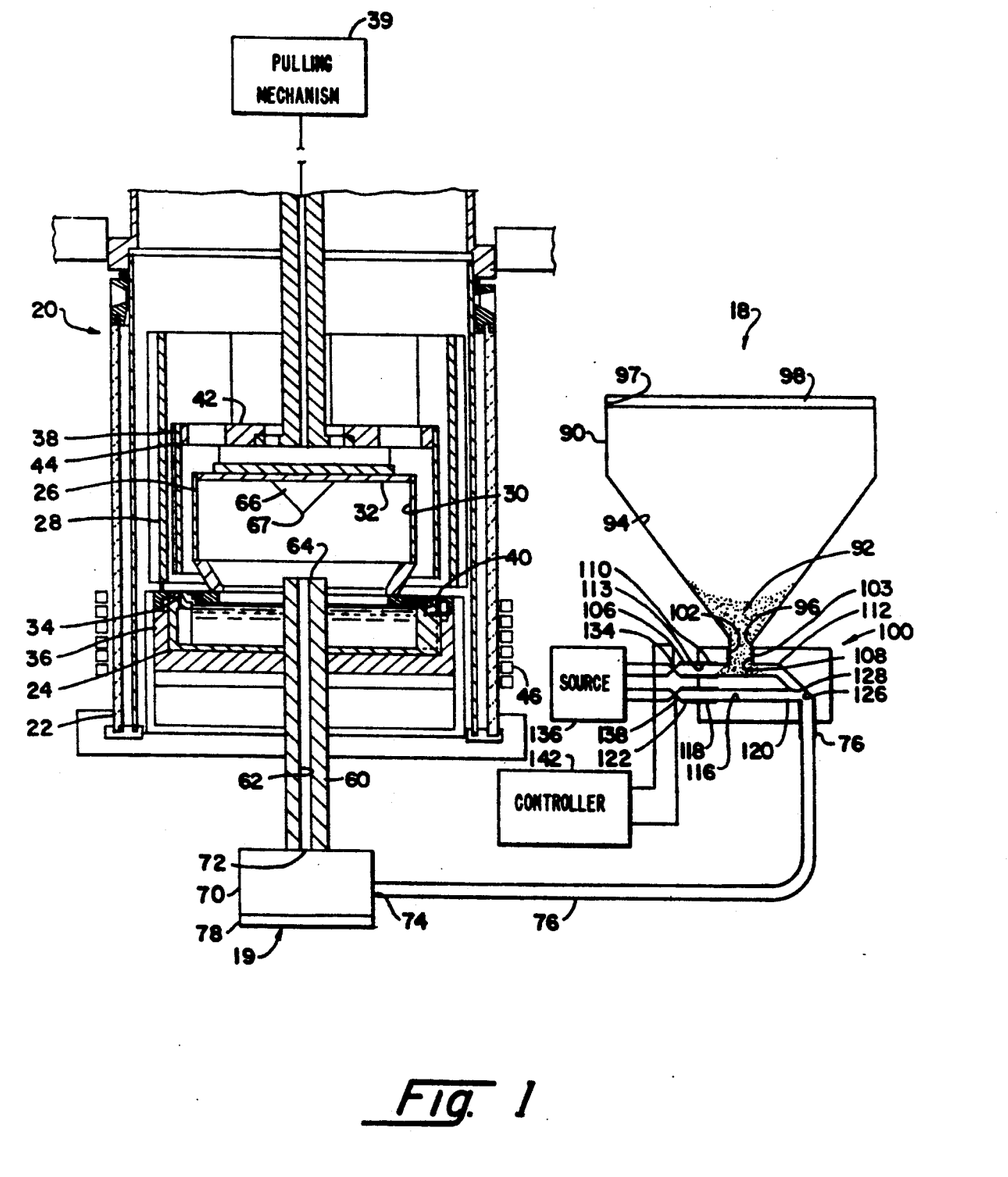
FIG. 1 is a fragmented view in elevation, with some components shown in section, of a source material delivery system embodying the present invention coupled to the source material feed mechanism associated with a crystal growth furnace.
Figure 2:
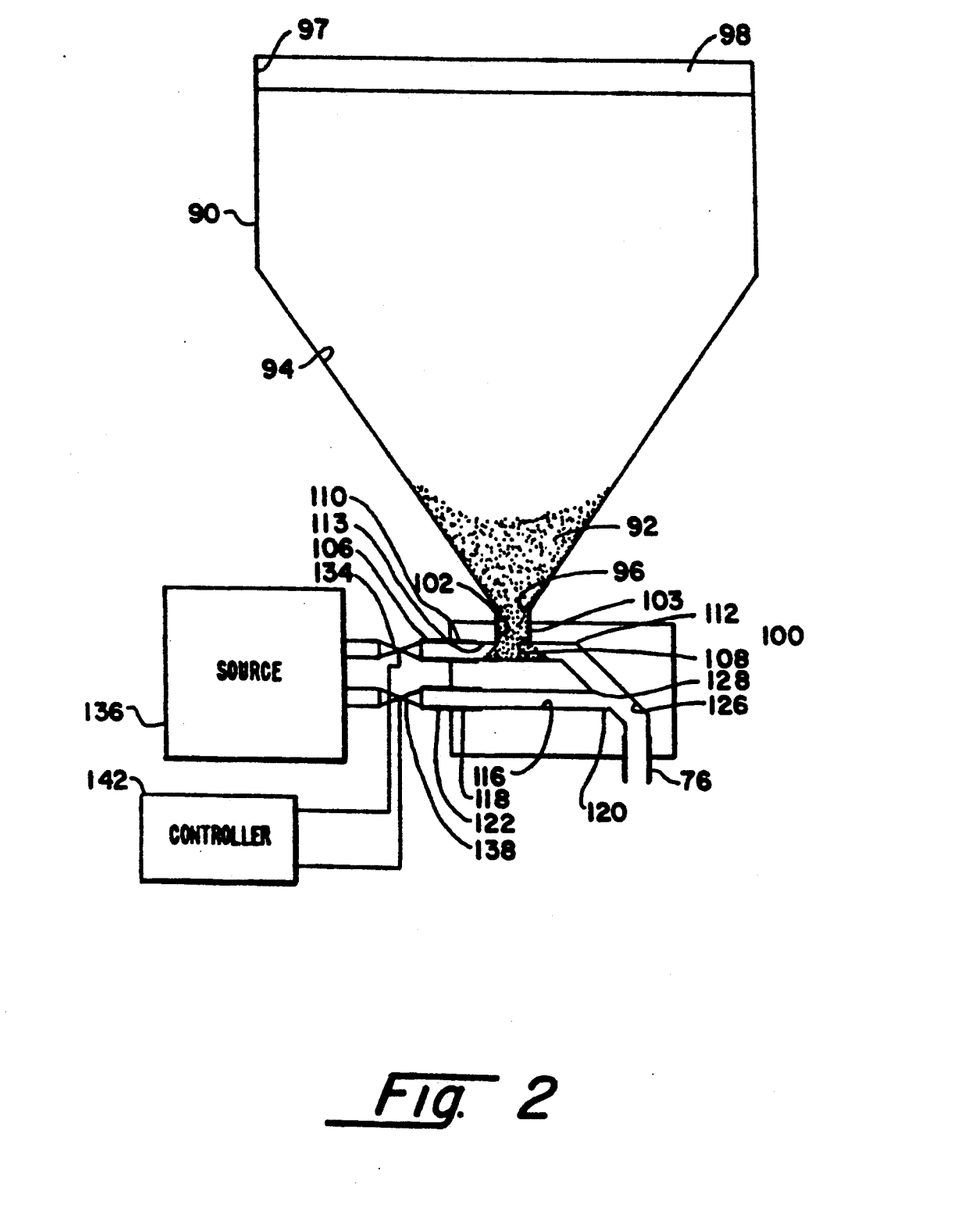
FIG. 2 is a schematic cross-sectional side elevation view of the source material delivery system embodying the present invention.

Referring to FIGS. 1 and 2, the illustrated apparatus comprises a delivery system 18 constructed according to this invention for supplying spherical, solid silicon particles to a feeder mechanism 19 that in turn transports the particles to the crucible of a furnace apparatus 20 for growing hollow, tubular crystalline bodies. Apparatus 20 preferably is of the type disclosed in U.S. Pat. No. 4,544,528 (the '528 patent), which patent is incorporated herein by reference. Feeder mechanism 19 may take various forms. Thus, for example, it may be a mechanism of the type described in U.S. Pat. No. 4,661,324, issued Apr. 28, 1987 in the name of Sink et al. (the '324 patent), which patent is also incorporated herein by reference.

By way of background, apparatus 20 (FIG. 1) comprises a furnace enclosure 22 within which are disposed crucible 24, and inner and outer tubular after-heaters 26 and 28. Crucible 24 is a short, hollow, open-topped right prism or right circular cylinder centrally disposed within enclosure 22. Inner after-heater 26 has a hollow interior 30 and a top plate 32 sealing off its top end. The bottom end of inner after-heater 26 is open, and the inner after-heater is positioned directly above crucible 24 whereby interior space 30 of the inner after-heater is coupled with the interior of the crucible. Inner after-heater 26 is located in the hollow interior of outer after-heater 28.

Apparatus 20 additionally comprises a capillary die 34, a susceptor 36 and a seed assembly 38, all of which are positioned in enclosure 22. Preferably, capillary die 34 is an integral part of the sidewall of crucible 24. The shape and dimension of the end face 40 of die 34 are selected to control the form and size of the grown crystal. Susceptor 36 is a short, hollow open-topped cylindrical or prismatic body dimensioned to accommodate crucible 24. Susceptor 36 may be an integral part of the die/crucible assembly. Seed assembly 38 includes a seed holder 42 and a seed 44. Seed assembly 38 is attached to a pulling mechanism 39 which is adapted to move seed holder 47 axially toward and away from die 34.

Apparatus 20 further includes a heating coil 46 surrounding enclosure 22 adjacent crucible 24. Heating coil 46 maintains the silicon in crucible 24 in a molten state.

As is known, the crystalline body is grown by positioning seed 44 in contact with the die end face 40 and then pulling the seed away from the die end face so as to form a meniscus between the seed and the die end face. As the seed is pulled away from the die end face, the portion of the meniscus closest to the seed solidifies. As the seed crystal is pulled even farther away from the die, new molten silicon is drawn by capillary action onto the die end face and molten silicon already present in the meniscus hardens to form crystalline silicon attached to the seed, so as to form an elongate silicon body.

For a more detailed description of the construction and operation of apparatus 20, attention is directed to the '528 patent.

For the purpose of the present invention, apparatus 20 is modified to include a conduit 60 having a central bore 62. Conduit 60 extends through the bottom walls of enclosure 22, susceptor 36 and crucible 24, as shown in FIG. 1. The inside diameter of conduit 60 is slightly greater than the outside diameter of the largest particles of silicon to be supplied by the system 18 of the present invention, as discussed below. Preferably, conduit 60 is made of fused silica. Conduit 60 is positioned in the center of crucible 24 and is sized so that its top end 64 extends up into the interior 30 of inner after-heater 26, above the top surface of the melt supported in crucible 24 when the crucible is full. Conduit 60 provides a passageway from the region below apparatus 20 up through the bottom wall of crucible 24 into the interior 30 of inner after-heater 26. Preferably, a convex conical deflector 66 is attached to the bottom surface of top plate 32 directly above the top end 64 of conduit 60, so that the pointed end 67 of the deflector is coaxially aligned with central bore 62.

In other respects, the crystal growth furnace illustrated in FIG. 1 is identical to the furnace described in the '528 patent.

Feed mechanism 19 comprises hollow storage chamber 70 for receiving and temporarily storing solid, spherical beads of silicon. Storage chamber 70 is positioned directly below the bottom end of conduit 60 and is coupled with the interior of the conduit via an aperture 72 provided in the top wall of the storage chamber. Storage chamber 70 includes an aperture 74 in the sidewall thereof and a supply conduit 76 attached to the sidewall so that the interior of the conduit communicates with the interior of the storage chamber.

Additionally, feed mechanism 19 includes a transporting mechanism 78 for transporting silicon beads from storage chamber 70 up through conduit 60 into the space above the crucible. As noted above, transporting mechanism 78 may comprise a chip thruster of the type disclosed in the '324 patent. Alternatively, it may comprise a pressurized gas jet feed system or other mechanism, the only requirement being that the mechanism be capable of delivering silicon beads from storage chamber 70 into the crucible in conduit 60 at substantially the same rate that particulate material is provided to the storage chamber 70 by conduit 76.

Turning now to FIG. 2, source material delivery system 18 includes a hollow container 90 for storing particles 92 of solid silicon. The bottom portion of container 90 preferably tapers inwardly and terminates in a bottom aperture 96. Container 90 preferably is open at the top to permit addition of a supply of particles 92, and a removable cover 98 is preferably provided for closing off the top end of the container.

Figure 4:
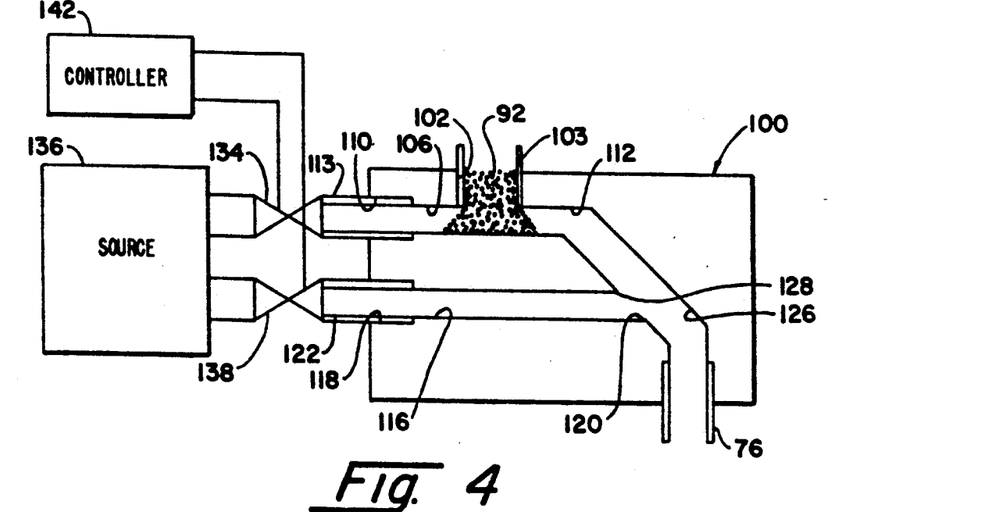
FIG. 4 is an enlarged view of the bottom portion of the delivery system illustrated in FIG. 2 shown at time T1.

Referring now to FIG. 4, system 18 further includes a manifold 100 attached to conduit 60. Manifold 100 consists of a solid block of material, such as polyethylene, which is hollowed out so as to form a plurality of interconnected passageways. Specifically, manifold 100 includes a vertically-extending hollow bore 102 which is lined with a hollow sleeve 103 which extends up into bottom aperture 96 of container 90, whereby the interior of bore 102 is coupled with interior 94 of container 90. Manifold 100 also includes a horizontally-extending silicon particle receiving chamber 106. The latter intersects and communicates with hollow bore 102. Preferably, hollow sleeve 103 extends down to and is flush with the upper side of receiving chamber 106. Thus, sleeve 103 acts as a delivery tube for transporting particles by gravity from container 90 to chamber 106.

As particles 92 fall into receiving chamber 106 they accumulate in a pile directly beneath bore 102. As more and more silicon particles 92 fall into receiving chamber 106, the pile enlarges until it extends from the bottom wall to the top wall of receiving chamber 106, with the top of the pile having a width about equal to the inside diameter of aperture 108 and the base of the pile having a width which is substantially greater than the width of the top of the pile. Once the pile has assumed this configuration, it blocks the flow of additional silicon particles from container interior 94 to receiving chamber 106.

The inside diameters of bore 102 and sleeve 103 are selected, and the internal configuration and dimensions of receiving chamber 106 are chosen so that, given the fact that the uniform particle shape and the substantially narrow range of particle size automatically determines a particular angle of repose, only a predetermined quantity (volume) of silicon particles 92 can fall from container interior 94 into receiving chamber 106.

As used herein, the slope of the sides of the pile of particles is called the angle of repose. This angle of repose and the size and configuration of silicon particles 92 and the size and configuration of receiving chamber 106 determine the volume of particles accumulating in a pile in receiving chamber 106. Where the size and configuration of silicon particles 92 is known and is substantially constant, a predetermined volume of silicon particles can thus be accumulated in receiving chamber 106 by properly sizing and configuring the latter.

In an exemplary working embodiment of the present invention, where the crystal growth apparatus 20 to which the present source material delivery system 18 was attached consumed molten silicon at the rate of 15 g per minute, and silicon particles 92 had a spherical configuration and a diameter of 0.7 millimeter, ± about ½ millimeter, receiving chamber 106 had a circular cross-sectional configuration, with an inside diameter of 5 mm, and a length of about 28 mm. The pile of silicon particles 92 that accumulated in receiving chamber 106 had an angle of repose of 15°.

Manifold 100 also includes a horizontally-extending bore 116. The latter is open at its ends 118 and 120. Preferably, a hollow sleeve 122 is disposed in end 118 of bore 116. The sleeve 122 is sized so as to project outwardly from manifold 100. A similar sleeve 113 is disposed in the outer end 110 of bore 106.

Manifold 100 additionally includes a transversely-extending inclined bore 126, one end of which is coupled with inner end 112 of receiving chamber 106 and the other end of which is coupled to supply conduit 76. By this coupling, receiving chamber 106 is coupled by conduit 76 to feed mechanism 19, and ultimately to the interior of apparatus 20. Bore 126 is intersected at 128 by the inner end 120 of bore 116, whereby the interior of bore 116 communicates with the interior of bore 126.

Feed system 18 additionally includes a valve 134 which connects sleeve 113 to a source 136 of pressurized fluid, typically an inert gas such as argon. System 18 also includes a valve 138 which connects sleeve 122 to gas source 136. Valves 134 and 138 are designed to selectively feed gas from source 136 to receiving chamber 106 and bore 116, respectively. Preferably, valves 134 and 138 are electrically operated, so that when an "open" control signal is provided to the valves they open and thereby admit a stream of pressurized fluid to the chamber or bore to which they are attached, and when a "close" control signal is provided to the valves they close and thereby terminate flow of pressurized fluid to the chamber or bore to which they are attached.

The volume flow rates of the pressurized fluid introduced from source 136 into receiving chamber 106 and bore 116 by operation of valves 134 and 138, respectively, is selected so as to ensure that all of particles 92 present in receiving chamber 106 are entrained in the stream of pressurized fluid supplied via valve 134 carried into bore 126, and are carried from bore 126 into and through supply conduit 76 as a result of entrapment in the gas stream introduced via operation of valve 138. Of course, the specific volume flow rates of the pressurized fluid passed by valves 134 and 138 will vary depending upon the size and configuration of particles 92 and the size and configuration of the receiving chamber and bores in 102, 106, 116 and 126 manifold 100.

In the working embodiment of system 18, source 136 provided argon gas at a pressure of about 100 pounds per square inch absolute, and opening of valves 134 and 138 caused gas to flow in the last of bores 106 and 116 respectively at a volume flow rate of about 5 liters STP (i.e., a temperature of 25 degrees C and an atmospheric pressure of 960 mm Hg) per minute. Spherical silicon particles having an outside diameter of about 0.7 millimeter, plus or minus about ½ millimeter, were used as the feed material.

Feed system 18 preferably includes a controller 142 coupled to valves 134 and 138 for providing the "open" and "close" control signals to valves 134 and 138. Controller 142 may, for example, consist of a conventional programmable industrial process control digital computer. As described in greater detail below in connection with the description of the operation of the feed system 18 of the present invention, controller 142 is programmed so as to automatically control the opening and closing of valves 134 and 138 so that when one of the valves is opened, the other of the valves is closed, and vice versa.

In connection with the following description of the operation of the feed system 18 of the present invention, reference should be made to FIGS. 1-5.

With valves 134 and 138 both closed, free-flowing silicon particles 92 are added to the interior 94 of the container. Preferably, particles 92 are spherical in configuration and have an outside diameter of about 0.7 millimeter, plus or minus about ½ millimeter.

Due to the pull of gravity, particles 92 pass through sleeve 103 into receiving chamber 106. As described above, receiving chamber 106 is sized and configured so that as the particles drop and accumulate in a pile having a shape determined by the angle of repose, only a predetermined quantity of particles can accumulate in receiving chamber 106, the particles coacting with the sidewalls of receiving chamber 106 so as to limit the volume of particles that can accumulate in a pile in receiving chamber 106.

Figure 5:
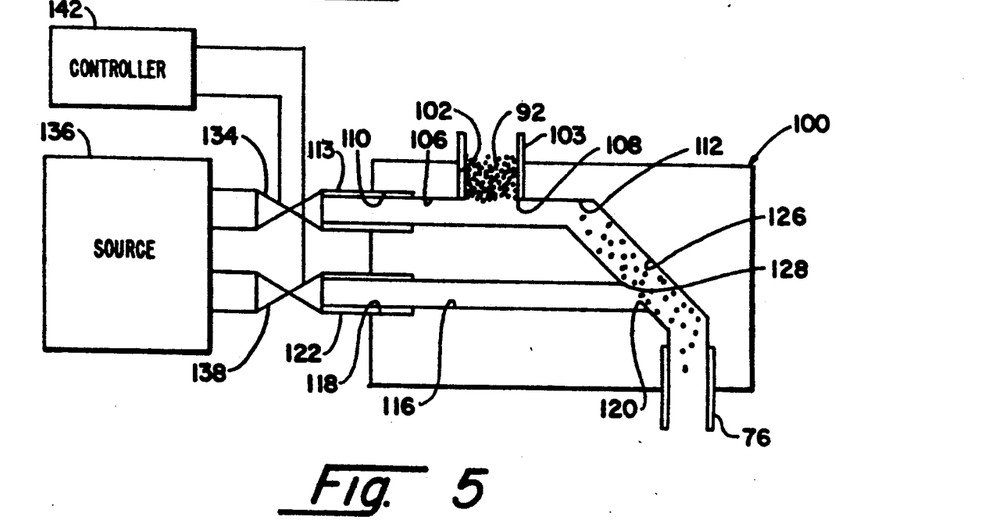
FIG. 5 is an enlarged view of the bottom portion of the same delivery system just after time T1.

Then at time T1 (FIG. 3), controller 142 is activated, whereupon it sends a control "open" signal to valve 134, which causes the valve to open. At the same time, controller 142 sends a control signal to valve 138 which causes the valve to close (or to remain closed if it is already in that state). The pressurized fluid in receiving chamber 106 forces the pile of particles 92 which has accumulated therein out of the receiving chamber and into bore 126. This operational state of feed system is illustrated in FIG. 5.

Figure 3:
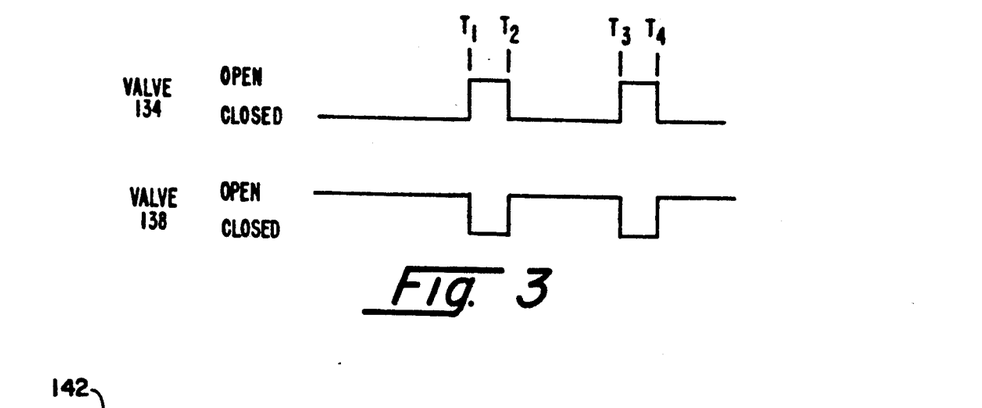
FIG. 3 is a timing diagram illustrating the timing sequence for valves of the same source material delivery system.

Valve 134 is opened only long enough to permit the stream of pressurized fluid generated by source 136 to dispense the particles 92 in receiving chamber 106 from the latter into bore 126. As such, a pulse of pressurized fluid rather than an ongoing, continuous stream of pressurized fluid is provided to receiving chamber 106. After the pile of particles 92 has been dispensed from receiving chamber 106 and before more particles have fallen from container 90 into receiving chamber 106, controller 142 sends a control "close" signal to valve 134 which causes the valve to close. This control signal is sent at time T2 as illustrated in FIG. 3.

Also at time T2, controller 142 sends a control "open" signal to valve 138 which causes the valve to open. Once valve 138 is open, a stream of pressurized fluid from source 136 travels through bore 116 and into bore 126 where it entrains the particles which were moved into bore 126 by the opening of valve 134.

These entrained particles are then transported by the stream of pressurized fluid into and through supply conduit 76 to storage chamber 70 of feed mechanism 19. Then, feed mechanism 19 transports the particles 92 from chamber 70 through conduit 60 into the interior of inner-after heater 26. The particles discharged into conduit 60 continue to travel upwardly within the inner after-heater 26 until they contact and bounce off deflector 66, if provided, and fall into the melt. Deflector 66 evenly distributes particles 92 so they enter the melt over substantially the entire surface thereof, thereby minimizing the formation of locally cool zones which can give rise to currents and thermal excursions in the melt which can adversely affect the crystal growth process. Where deflector 66 is not provided, particles 92 merely bounce off the bottom surface of plate 32 and fall into the melt. In certain cases, acceptable results can be obtained without the use of deflector 66.

As soon as valve 134 is closed, i.e. immediately after time T2, particles 92 begin again to accumulate in receiving chamber 106 until a predetermined quantity of particles has accumulated. This accumulation occurs between time T2 and time T3 (FIG. 3). At time T3, controller 142 provides a control "open" signal to valve 134 which causes the latter to open and a control "close" signal to valve 138 which causes the latter to close. As described above, the particles in receiving chamber 106 are transported into bore 126 by the pressurized fluid supplied to receiving chamber 106. At time T4, controller 142 provides control signals which cause valve 134 to close and valve 138 to open, whereby the particles 92 in bore 126 are transported to feed mechanism 19, as described above. This sequence of opening and closing valves 134 and 138 is repeated during the crystal growth process.

The length of time between the closing and opening of valve 134, i.e. the time between T2 and T3, is selected based on the rate at which molten silicon is consumed by apparatus 20 in growing a crystalline body. Controller 142 may be programmed so that the time period between the closing and opening of valve 134 is fixed, based on empirical data regarding the rate at which apparatus 20 consumes molten silicon. Alternatively, controller 142 may be programmed to vary the time period between the closing and opening of valve 134 based on information regarding the change in weight of the growing crystalline body generated concurrently with the growth of the body. Using this information, controller 142 will cause valves 134 and 138 to open and close so as to ensure that the quantity of silicon particles 92 provided to apparatus 20 is substantially equal to the quantity of silicon consumed by the apparatus.

The frequency at which valves 134 and 138 are opened and closed is based on the assumption that the quantity of silicon particles which accumulates in receiving chamber 106 is substantially constant. As discussed above, receiving chamber 106 is designed to ensure that a selected substantially constant quantity of particles 92 accumulates in the receiving chamber. The specific size and configuration of receiving chamber 106 and hence the size of the pile of particles 92 which can accumulate in receiving chamber 106 are chosen on the basis of empirical data regarding the quantity of silicon particles which can be added to the melt in crucible 24 of apparatus 20 without causing unacceptable large thermal perturbations in the melt.

In an exemplary embodiment of the present invention, valve 134 is open for about 0.01 seconds, and valve 134 is closed for a time period ranging from 1.4 seconds to 3.0 seconds. In this embodiment, receiving chamber 106 was sized and configured so that about 0.5 g of solid spherical silicon particles having an average diameter of about 0.7 mm ± about ½ millimeter accumulated in the receiving chamber.

It is preferred that one of valves 134 and 138 be open at all times during the operation of source material delivery system 18 to ensure that a reasonably constant gas flow is provided from the delivery system 18, through feed mechanism 19, and into the interior of inner-after heater 26. Such a gas flow is desirable to avoid the deleterious affects of pressure surges in the crystal growth region. Such surges can, for instance, adversely affect the output of the load cell which measures the weight of the growing crystalline body. Because the output of the load cell is used in controlling the crystal growth process, when erroneous information is provided by the load cell the crystal growth process may be adversely affected.

However, in certain circumstances a continuous stream of gas need not be provided from the delivery system to the crystal growth region. Under these circumstances, valve 138 is opened only long enough to transport particles 92 in bore 126 to feed mechanism 19. Alternatively, it may be possible in certain situations to eliminate valve 138 and bore 116. In this case, the pressurized fluid provided to receiving chamber 106 transports the particles 92 into and through bore 126, into supply conduit 76 and through the latter into storage chamber 70 in feed mechanism 19.

Although source material delivery system 18 has been described as a system for delivering solid spherical silicon particles to the feed mechanism 19 of a crystal growth apparatus 20, the system may be satisfactorily employed in other contexts where it is desired to transport a predetermined quantity of a uniform particulate material from a storage container to a downstream location. For instance, system 18 may be used in a pharmaceutical manufacturing process where it is desired to transport a predetermined quantity of a first compound in a particulate form to a downstream location where it is combined with a second compound in particulate form. Where system 18 is used in other manufacturing contexts and the size, configuration, and material of the particles being used differs from that of the silicon particles 92 used in the preferred configuration of this invention, the size of receiving chamber 106 must be selected so that the quantity of particles which can accumulate therein is equal to the quantity of particles which is to be delivered to the downstream location. Additionally, it may be necessary or desirable to modify the pressure of gas source 136 to ensure that the particles being transported are completely entrained in the pressurized gas and are carried by that gas to the selected downstream location. Where non-spherical particles are used, it is important that the particles either be very small, e.g. no more than about 1/20 the diameter of receiving chamber 106, or have an L/D aspect ratio not greater than 3 to 1 (where L is the length and D is the diameter of the particle).

An important advantage of the present invention is that the quantity of silicon particles 92 which is provided to feed mechanism 19, and hence to the melt in crucible 24 of apparatus 20 can be precisely controlled. As a result, the physical and electrical properties of the crystalline body grown with apparatus 20 can be optimized.

Another important advantage of the present invention is that the silicon particles 92 delivered by system 18 do not come into contact with any moving parts or any metallic components during their transport to feed mechanism 19, assuming container 70, manifold 100, and supply conduit 76 are made from non-metallic materials. By avoiding the use of moving parts which tend to wear away due to mechanical interaction between parts, and by avoiding the use of metallic parts which can be abraded away by the abrasive silicon particles 92, the introduction of contaminants into the particles feed system and hence into the silicon melt is minimized. This is a very important consideration in the manufacture of silicon substrates for use in making semiconductor devices, e.g., photovoltaic solar cells, since only a few parts per million of undersirable contaminants can adversely affect device performance.

Since certain changes may be made in the above apparatus and method without departing from the scope of the invention herein involved, it is intended that all matter contained in the above description or shown in the accompanying drawing shall be interpreted in an illustrative and not in a limiting sense.

What is claimed is:

1. A system for repeatedly transporting in particulate form a predetermined quantity of particles of a particulate material to a remote site at certain intervals, the system comprising:

(a) storage means for storing said particulate material, said storage means comprising a tapered bottom section having an aperture coupled to the upper end of a downwardly extending hollow sleeve;

(b) a chamber positioned below said storage means in communication with the lower end of said hollow sleeve so that a continuous flow of solid particulate material moves from said storage means to said chamber under the pull of gravity;

(c) the inside diameter of said hollow sleeve and the internal configuration and dimensions of said chamber being related to particle size and shape such that said particulate material accumulates in said chamber in a generally frusto-conical shaped pile having a particular angle of repose, said pile extending from the floor of said chamber to the lower end of said hollow sleeve so as to prevent additional particulate material from entering said chamber means until said pile is removed, whereby said pile consists of a predetermined quantity of said particulate material;

(d) first and second conduits, said first conduit being coupled at one end to said chamber and downstream thereof to said second conduit, said first conduit being coupled at its other end to a third conduit, said first conduit providing a pathway for said particulate material from said chamber to said third conduit, and said third conduit providing a pathway for said particulate material to said remote site;

(e) first fluid delivery means coupled to said chamber for providing a short burst of a pressurized gaseous fluid to said chamber so as to displace said pile of particulate material from said chamber to said first conduit; and (f) second fluid delivery means coupled directly to said second conduit for providing a stream of a pressurized gaseous fluid so as to entrain said particulate material in said first conduit and transport said entrained particulate material out of said third conduit to said remote site.

2. A system according to claim 1 wherein said first and second fluid delivery means comprise respectively first and second control valve means for starting and stopping said streams of pressurized fluid, so as to permit said streams to flow in discrete pulses of selected duration at selected time intervals.

3. A system according to claim 1 wherein said particulate material consists of free-flowing spherical beads of silicon and said gaseous fluid is an inert gas.

4. A system according to claim 1 wherein said first and second fluid delivery means comprise:

first valve means associated with said first fluid delivery means for selectively blocking and unblocking the flow of pressurized fluid to said chamber, so as to cause said fluid to be delivered to said chamber in discrete pulses of selected duration at selected time intervals;

second valve means associated with said second fluid delivery means for selectively blocking and unblocking the flow of pressurized fluid to said second conduit, so as to cause said fluid to be delivered to said second conduit in discrete pulses of selected duration at selected time intervals; and control means coupled to said first and second valve means for controlling the operation of said first and second valve means so that said first valve means permits pressurized fluid to be delivered only when said second valve means blocks pressurized fluid from being delivered, and vice versa.

5. A system according to claim 4 wherein (a) said first valve means blocks the flow of pressurized fluid in response to a first control signal and unblocks the flow of pressurized fluid in response to a second control signal, and (b) said second valve means blocks the flow of pressurized fluid in response to a third control signal and unblocks the flow of pressurized fluid in response to a fourth control signal.

6. Apparatus according to claim 5 further wherein said control means generates said first, second, third and fourth control signals and provides said signals to said first and second valve means so as to cause said first valve means to block said pressurized fluid when said second valve means unblocks said pressurized fluid, and to cause said first valve means to unblock said pressurized fluid when said second valve means blocks said pressurized fluid.

7. A system for transporting in particulate form a predetermined quantity of particulate material stored in a container from the container to a remote site, the system comprising:

(a) a chamber coupled to said container for receiving by continuous gravity feed a limited, predetermined quantity of said particulate material from said container;

(b) a sloping first conduit coupled to said chamber for providing a pathway from said chamber to a third conduit, a second conduit being coupled to said first conduit intermediate its ends, said third conduit providing a pathway to said remote site;

(c) first fluid delivery means coupled to said chamber for providing a stream of pressurized fluid to said chamber for flushing said predetermined quantity of particulate material out of said chamber into said first conduit and into the area where said second conduit is coupled to said first conduit; and (d) second fluid delivery means coupled directly to said second conduit for providing a stream of pressurized fluid to said second conduit to exit into said first conduit to entrain said predetermined quantity of particulate material and transport it out of said first conduit and through said third conduit means to said remote site.

8. A system for feeding spherical silicon particles into a crystal growth apparatus for growing a hollow, tubular crystalline body, the apparatus including a crucible for containing a melt of silicon, the system comprising:

(a) a container for storing spherical silicon particles and a discharge opening through which silicon particles may be dispensed from said container;

(b) a manifold positioned below said container, said manifold comprising (i) a receiving chamber coupled to said container discharge opening so that silicon particles stored in said container flow continuously under the pull of gravity into said receiving chamber, said manifold being arranged so as to admit only a predetermined quantity of spherical silicon particles into said chamber from said container, and (ii) a sloping passageway in communication with said chamber;

(c) first valve means for selectively coupling and decoupling a source of pressurized fluid to said receiving chamber;

(d) second valve means for selectively coupling and decoupling a source of pressurized fluid directly to said sloping passageway; and (e) conduit means connecting said passageway to said crystal growth apparatus.

9. A system for growing tubular, hollow crystalline bodies, the system comprising:

(a) an apparatus for growing tubular, hollow crystalline bodies, said apparatus including a crucible having a bottom end wall and an opening in said bottom end wall, a hollow pipe extending through said bottom end wall and terminating above said crucible, and a feed mechanism for transporting silicon particles through said hollow pipe and ejecting said particles from the top end of said hollow pipe so that said particles will fall by gravity back into said crucible;

(b) storage means for storing spherical silicon particles, said storage means having a discharge orifice;

(c) a chamber coupled to said discharge orifice for continuously receiving said particles from said storage means and permitting a predetermined quantity of said particles to accumulate in said chamber;

(d) first and second conduits, said first conduit being connected at one end to said chamber and downstream thereof to said second conduit, said first conduit being coupled at its other end to a third conduit, the other end of said third conduit being connected to said feed mechanism;

(e) first fluid delivery means for providing a pressurized gaseous fluid to said chamber so as to propel said predetermined quantity of said particles from said chamber into said first conduit; and (f) second fluid delivery means for providing a pressurized gaseous fluid to said second conduit so as to transport said particles by entrainment from said first conduit via said third conduit into said feed mechanism.

10. A method for supplying silicon particles having a spherical configuration to a feed mechanism for feeding said particles into an apparatus for growing hollow tubular crystalline bodies, said method comprising the steps of:

(1) providing a system for delivering spherical silicon particles to said feed mechanism comprising:

(a) a container for storing spherical silicon particles and a discharge opening through which silicon particles may be dispensed from said container;

(b) a manifold positioned below said container, said manifold comprising (i) a receiving chamber coupled to said container discharge opening, so that silicon particles stored in said container flow continuously under the pull of gravity into said receiving chamber, said receiving chamber being sized and configured so as to admit thereto only a predetermined quantity of spherical silicon particles from said container, (ii) said receiving chamber being substantially horizontally arranged, and (iii) a sloping first bore in communication with said chamber;

(c) a source of pressurized gaseous fluid;

(d) a first valve for selectively coupling and decoupling said receiving chamber and said source of pressurized fluid;

(e) a second valve for selectively coupling and decoupling said first bore and said source of pressurized fluid; and (f) conduit means connecting said first bore to said feed mechanism;

(2) adding a supply of spherical silicon particles of predetermined diameter to said container;

(3) closing said second valve and opening said first valve so as to permit said pressurized fluid to flow into said receiving chamber, entrain said predetermined quantity of silicon particles in said receiving chamber and transport said particles through said chamber into said first bore; and (4) closing said first valve and opening said second valve so as to permit said pressurized fluid to flow into said first bore in order to entrain said silicon particles and carry said entrained particles out of said first bore and through said conduit means into said feed mechanism.

11. A method according to claim 10 wherein the period of time between when said first valve is opened and when said first valve is closed is selected so as to permit said pressurized fluid to entrain said predetermined quantity of silicon particles in said receiving chamber and transport said particles into said first bore before any further substantial quantity of said silicon particles can pass from under the pull of gravity from said container into said receiving chamber.

12. A method according to claim 11 wherein said particles have a diameter of about 0.7 millimeter ± about ½ millimeter.

13. A method of transporting in particulate form a selected particulate method from a storage location to a remote site, the method comprising the steps of:

(1) providing a system for transporting solid, particulate material from a storage location to a remote site, the system comprising:
  (a) a storage container for storing particulate material and a discharge opening through which said particulate material may be dispensed from said container;
  (b) a manifold disposed below said container, said manifold comprising
    (i) a receiving chamber coupled to said container discharge opening, so that particulate material stored in said container flows continuously under the flow of gravity into said receiving chamber, said receiving chamber being sized and configured so as to admit thereto only a predetermined quantity of particulate material from said container,
    (ii) said receiving chamber being substantially horizontally arranged, and
    (iii) a sloping first bore in communication with said chamber;
  (c) a source of pressurized gaseous fluid;
  (d) a first valve for selectively coupling said receiving chamber with and decoupling said receiving chamber from said source of pressurized fluid;
  (e) a second valve for selectively coupling said chamber with and decoupling said first bore from said source of pressurized fluid; and
  (f) conduit means connecting said first bore to said remote site;
(2) adding solid particulate material to said storage container;
(3) closing said second valve and opening said first valve so as to permit said pressurized fluid to flow into said receiving chamber, entrain said predetermined quantity of particulate material in said receiving chamber and transport said particulate material into said first bore; and
(4) closing said first valve and opening said second valve so as to permit said pressurized fluid to flow into said first bore in order to transport said entrained particulate material out of said first bore and through said conduit means to said remote site.

14. A method according to claim 13 wherein said selected particulate material essentially consists of free-flowing spherical beads of silicon and said gaseous fluid is argon.

15. Apparatus for creating a stream of discrete batches of particulate material, each batch containing a predetermined volume of particles, said apparatus comprising:
  storage means for storing said particulate material, said storage means including a botton section having a discharge aperture;
  a metering chamber positioned in communication with the discharge aperture, whereby said solid particulate material may flow by gravity from said storage means through said aperture to said chamber;
  the configuration and arrangement of said chamber being such that said particulate material accumulates in said chamber in a pile which extends from the floor of said chamber to the aperture and completely blocks said aperture, whereby further particulate material is prevented from entering said chamber until said pile is removed, and further whereby said pile consists of a predetermined volume of said particulate material having a predetermined angle of response, and the volume of such particulate material thus deposited in the chamber is the same from batch to batch;
  first and second conduits, said first conduit being coupled at one end to said chamber and downstream thereof to said second conduit, said first conduit being coupled at its other end to a third conduit thus providing a pathway for said particulate material from said chamber to said third conduit to the exterior of said apparatus;
  a first fluid delivery means coupled to said metering chamber for providing a short burst of a pressurized gaseous fluid to said chamber so as to displace said pile of particulate material from said chamber and entrain same to said first conduit; and
  a second fluid delivery means in communication with said second conduit providing a stream of a pressurized gaseous fluid for entraping said entrained particulate material in said first conduit and transporting same externally of said apparatus through said third conduit.

16. An apparatus according to claim 15 wherein said particles have a diameter of about 0.7 millimeter ± about ½ millimeter.

17. Apparatus according to claim 15 wherein said storage means comprises a conically-shaped reservoir, said first conduit slopes downwardly from said metering chamber and said second conduit is coupled to said first conduit intermediate its ends.

18. Apparatus according to claim 15 wherein said particulate material consists of free-flowing spherical beads of silicon and said gaseous fluid is an inert gas.

19. Apparatus according to claim 15 for use in association with a crystal growing apparatus for growing a hollow, tubular crystalline body, wherein said crystal growing apparatus includes a crucible for containing a melt of silicon, further characterized in that said metering chamber and conduits are formed in a manifold positioned below said container, with the chamber being connected to said discharge aperture, and said conduits being formed as bores in said manifold, and a fourth conduit being connected from said third conduit to the crucible, of said crystal growing apparatus.

20. An apparatus according to claim 15 wherein said first and second fluid delivery means include respectively first and second control valve means for starting and stopping said streams of pressurized fluid, so as to permit said streams to flow in discrete pulses of selected duration at selected time intervals.

21. An apparatus according to claim 20 including control means coupled to said first and second valve means for controlling the operation of said first and second valve means so that said first valve means permits pressurized fluid to be delivered only when said second valve means blocks pressurized fluid from being delivered, and vice versa.

22. Apparatus according to claim 21 wherein (a) said first valve means blocks the flow of pressurized fluid in response to a first control signal and unblocks the flow of pressurized fluid in response to a second control signal, and (b) said second valve means blocks the flow of pressurized fluid in response to a third control signal and unblocks the flow of pressurized fluid in response to a fourth control signal.

23. Apparatus according to claim 22 further wherein said control means generates said first, second, third and fourth control signals and provides said signals to said first and second valve means so as to cause said first valve means to block said pressurized fluid when said second valve means unblocks said pressurized fluid, and to cause said first valve means to unblock said pressurized fluid when said second valve means blocks said pressurized fluid.

24. A method for supplying a stream of discrete batches of silicon particles to a feed mechanism for feeding said particles into an apparatus for growing hollow tubular crystalline bodies, said method comprising the steps of:
(1) providing an apparatus for delivering batches of silicon particles to said feed mechanism which apparatus comprises:
  (a) a container for storing silicon particles and a discharge opening through which silicon particles may be dispensed from said container;
  (b) a manifold positioned below said container, said manifold comprising
    (i) a receiving chamber coupled to said container discharge opening, so that silicon particles stored in said container may flow continuously under the force of gravity into said receiving chamber, said receiving chamber being sized and configured so as to admit thereto only a predetermined quantity of silicon particles from said container,
    (ii) a first bore adjacent said receiving chamber,
    (iii) a second bore in communication with said first bore, and
    (iv) a third bore leading from said first bore downstream of said second bore;
  (c) a source of pressurized gaseous fluid;
  (d) a first valve for selectively coupling and decoupling said receiving chamber and said source of pressurized fluid;
  (e) a second valve for selectively coupling and decoupling said second bore and said source of pressurized fluid; and
  (f) conduit means connecting said third bore to said feed mechanism;
(2) adding a supply of silicon particles to said container;
(3) closing said second valve and opening said first valve so as to permit said pressurized fluid to flow into said receiving chamber, thereby removing said batch of predetermined quantity of silicon particles from said receiving chamber and entraining said particles into said first bore; and
(4) closing said first valve and opening said second valve so as to permit said pressurized fluid to flow into said second bore and thence into said first bore in order to transport said entrained silicon particles from said first bore and through said conduit means into said feed mechanism.

25. A method according to claim 24 wherein said particles have a diameter of about 0.7 millimeter ± about ½ millimeter.

26. A method according to claim 24 wherein the period of time between when said first valve is opened and when said first valve is closed is selected so as to permit said pressurized fluid to entrain said predetermined quantity of silicon particles in said receiving chamber and transport said particles into said first bore before any further substantial quantity of said silicon particles can pass under the force of gravity from said container into said receiving chamber.

27. A method according to claim 26 wherein the step of adding particulate material essentially consists of adding free-flowing spherical beads of silicon and the step of providing a source of pressurized fluid consists of providing argon is gaseous form.

* * * * *

UNITED STATES PATENT AND TRADEMARK OFFICE
CERTIFICATE OF CORRECTION

PATENT NO. : 5098229
DATED : March 24, 1992
INVENTOR(S) : Frederick U. Meier et al It is certified that error appears in the above-identified patent and that said Letters Patent is hereby corrected as shown below:

Claim 13, line 2, (column 12, line 67), the word "method" should be -- material --;

Claim 13, column 13, line 13, the word "flow" should be -- pull --;

Claim 15, column 14, line 1, "response" should be -- repose --; and

Claim 27, column 16, line 36, the word "is" should be -- in --.

Signed and Sealed this

Second Day of November, 1993

*Attest:*

BRUCE LEHMAN

*Attesting Officer*  *Commissioner of Patents and Trademarks*